United States Patent
Tesar et al.

(10) Patent No.: US 9,885,598 B2
(45) Date of Patent: Feb. 6, 2018

(54) MEASURING APPARATUS FOR THE FILLING LEVEL OF A CONTAINER

(71) Applicant: Robert Bosch GmbH, Stuttgart (DE)

(72) Inventors: Petr Tesar, Olesnik (CZ); Martin Kalas, Strakovice (CZ); Jan Nekula, Znojmo (CZ)

(73) Assignee: Robert Bosch GmbH, Stuttgart (DE)

(*) Notice: Subject to any disclaimer, the term of this patent is extended or adjusted under 35 U.S.C. 154(b) by 95 days.

(21) Appl. No.: 14/908,529

(22) PCT Filed: Jun. 18, 2014

(86) PCT No.: PCT/EP2014/062796
§ 371 (c)(1),
(2) Date: Jan. 28, 2016

(87) PCT Pub. No.: WO2015/014534
PCT Pub. Date: Feb. 5, 2015

(65) Prior Publication Data
US 2016/0178427 A1  Jun. 23, 2016

(30) Foreign Application Priority Data
Jul. 31, 2013 (DE) .......... 10 2013 215 015

(51) Int. Cl.
*G01F 23/38* (2006.01)
*G01F 23/32* (2006.01)

(52) U.S. Cl.
CPC .............. *G01F 23/38* (2013.01); *G01F 23/32* (2013.01)

(58) Field of Classification Search
CPC ........... B60K 2015/03217; G01F 23/38; G01F 23/32; G01F 23/34; G01F 23/363; G01F 23/54; G01F 23/36; G01F 23/62
See application file for complete search history.

(56) References Cited

U.S. PATENT DOCUMENTS

| 4,229,973 A * | 10/1980 | Hara ....................... G01F 23/32 73/317 |
| 6,401,533 B1 * | 6/2002 | Gier ..................... B60K 15/077 73/313 |

(Continued)

FOREIGN PATENT DOCUMENTS

| CA | 902683 | 6/1972 |
| DE | 10142618 | 3/2003 |

(Continued)

OTHER PUBLICATIONS

International Search Report for Application No. PCT/EP2014/062796 dated Sep. 22, 2014 (English Translation, 2 pages).

*Primary Examiner* — David A Rogers
(74) *Attorney, Agent, or Firm* — Michael Best & Friedrich LLP

(57) ABSTRACT

The invention relates to a measuring apparatus (10) for measuring a filling level of a container, which measuring apparatus has a measuring arm (12) with a float element (18) which is designed to change its angular position about a rotation axis (38) depending on the filling level. A magnet element (24) is connected to one end of the measuring arm (12) in a rotationally fixed manner. A magnet-sensitive element (26) is designed to output a measurement signal (27) depending on the angular position of the magnet element (24). The measuring apparatus (10) is characterized in that the measuring arm (12) is mounted in a first bearing (22) and additionally in a second bearing (36), wherein the magnet element (24) is arranged in an intermediate space (34) between the first bearing (22) and the second bearing (36).

7 Claims, 2 Drawing Sheets

(56) References Cited

U.S. PATENT DOCUMENTS

| | | | | |
|---|---|---|---|---|
| 6,453,741 B1* | 9/2002 | Beck, II | G01F 23/38 | 340/623 |
| 6,564,632 B2* | 5/2003 | Ross, Jr. | G01F 23/38 | 73/290 R |
| 6,679,116 B2* | 1/2004 | Ross, Jr. | G01F 23/34 | 73/290 R |
| 6,851,315 B2* | 2/2005 | Bergsma | G01F 23/363 | 73/290 R |
| 6,976,394 B2* | 12/2005 | Kleinen | G01F 23/38 | 116/227 |
| 7,093,485 B2* | 8/2006 | Newman | G01F 23/32 | 73/317 |
| 7,165,450 B2* | 1/2007 | Jamnia | G01F 23/38 | 73/317 |
| 7,201,052 B2* | 4/2007 | Lee | G01F 23/38 | 73/317 |
| 7,377,163 B2* | 5/2008 | Miyagawa | G01F 23/38 | 73/305 |
| 7,458,261 B2* | 12/2008 | Miyagawa | G01F 23/363 | 73/290 R |
| 7,673,509 B2* | 3/2010 | Cochran | G01F 23/38 | 73/311 |
| 8,015,871 B2* | 9/2011 | Sohn | G01F 23/38 | 340/625 |
| 8,136,396 B2* | 3/2012 | Mundo | G01F 23/38 | 73/317 |
| 8,671,750 B2* | 3/2014 | Fukuhara | G01F 23/38 | 73/314 |
| 9,453,756 B2* | 9/2016 | Ogasawara | G01F 23/38 | |
| 2004/0003660 A1* | 1/2004 | Fukuhara | G01F 23/38 | 73/319 |
| 2004/0182150 A1* | 9/2004 | Okada | G01F 23/36 | 73/313 |
| 2004/0231416 A1* | 11/2004 | Kumagai | G01F 23/38 | 73/313 |
| 2005/0103103 A1* | 5/2005 | Newman | G01F 23/32 | 73/313 |
| 2005/0146323 A1* | 7/2005 | Kleinen | G01R 33/07 | 324/207.26 |
| 2006/0016256 A1* | 1/2006 | Bauerle | G01F 23/36 | 73/313 |
| 2006/0048571 A1* | 3/2006 | Lee | G01F 23/38 | 73/313 |
| 2006/0272405 A1* | 12/2006 | Feher | G01F 23/38 | 73/313 |
| 2007/0290681 A1* | 12/2007 | Yasuda | G01F 23/38 | 324/207.25 |
| 2008/0202231 A1* | 8/2008 | Sohn | G01F 23/38 | 73/317 |
| 2008/0231267 A1* | 9/2008 | Miyagawa | G01F 23/38 | 324/207.25 |
| 2010/0223993 A1* | 9/2010 | Shimizu | G01F 23/36 | 73/317 |
| 2011/0016970 A1* | 1/2011 | Sakamaki | G01F 23/363 | 73/317 |
| 2012/0011931 A1* | 1/2012 | Ichisawa | G01F 23/38 | 73/317 |
| 2012/0111108 A1* | 5/2012 | Hashimoto | G01F 23/363 | 73/317 |
| 2013/0055807 A1* | 3/2013 | Cochran | G01F 23/363 | 73/313 |
| 2014/0116131 A1* | 5/2014 | Forgue | G01F 23/38 | 73/313 |
| 2015/0107355 A1* | 4/2015 | Iryo | G01F 23/72 | 73/313 |
| 2015/0338263 A1* | 11/2015 | Iryo | G01F 23/38 | 73/317 |
| 2015/0346018 A1* | 12/2015 | M | G01D 5/2013 | 73/314 |
| 2016/0161321 A1* | 6/2016 | Miyagawa | G01F 23/38 | 73/317 |
| 2016/0313172 A1* | 10/2016 | Nakamura | F02M 37/106 | |

FOREIGN PATENT DOCUMENTS

| | | | |
|---|---|---|---|
| DE | 102005003741 | 1/2006 | |
| DE | 102005062775 | 7/2007 | |
| JP | 62201324 A * | 9/1987 | G01F 23/36 |

* cited by examiner

MEASURING APPARATUS FOR THE FILLING LEVEL OF A CONTAINER

BACKGROUND OF THE INVENTION

The present invention concerns the measurement of a filling level in a container. In particular, the invention concerns a measuring apparatus for measurement of a filling level based on a magnetic measurement principle.

Level measuring devices are used in many different technological areas. In particular, in vehicle technology measurement apparatuses can be used that measure different liquid levels, such as of fuel, cooling liquid, brake fluid or similar for example. Accurate measurement of filling levels with small measurement tolerances can be necessary for the safe operation and reliability of a vehicle. For the technical implementation, a number of different requirements can be placed on such measurement apparatuses at the same time. For example, besides robustness and durability, as well as a resistance to different chemical compounds, high accuracy of the measurement results may be required.

Thus for example, measurement sensors are known from the prior art, with which a change of a filling level causes rotation of a magnetic element. Said change of the angular position of a magnet element causes a change of an electrical output signal at a magnetically coupled static sensor element. An apparatus for the measurement of a filling level, in which the sensor element and the magnet element are disposed in a common chamber of a sensor housing, is presented in DE 10 2005 062775 A1. In this the magnet element is mechanically coupled to a floating arm that is mounted so as to be rotatable about a rotation axis. The design and the operation of said measurement apparatuses can often make a compromise necessary regarding the diverse requirements.

SUMMARY OF THE INVENTION

Ideas of the invention can be viewed as being based on the ideas and knowledge described below among other things.

A measurement arm connected for example to a float element is often implemented in the form of a metallic shaft or of a metallic pin that is fed by means of a bearing into an internal region of a housing and that extends across the entire width of a sensor housing to an opposite housing wall for example. Here the magnet element is often disposed directly on the measurement arm or on the shaft, wherein the magnet element rotates together with the measurement arm or the shaft in the event of a change of the filling level. During this the spatial change of position of the magnet element produces a change of the magnetic field produced by the magnet element. Said change is detected by a magnetically sensitive element and the corresponding electrical measurement signals are generated. For this the magnetically sensitive element is often disposed away from the rotation axis of the measurement arm, for example radially separated from the magnet element. Said non-axial arrangement of the magnet element and the magnetically sensitive element can result in a compromise regarding the accuracy and linearity of the measurement results depending on a filling level.

In order to take said aspect into account, there are solutions in the prior art with which the magnet element and the magnetically sensitive sensor are disposed on the rotation axis of the measurement arm. Here the magnet element can be disposed on one end of the measurement arm or on one end of the shaft for example. Said arrangement is often referred to as an end of shaft arrangement. However, it is necessary for this that the magnet element can perform a rotary movement together with the measurement arm depending on the filling level, wherein the magnetically sensitive sensor is fixedly joined to a sensor housing for example as a reference. For this the measurement arm is supported in a single bearing in the sensor housing with such solutions. Feeding the measurement arm through to an opposite side of the housing is not possible with such end of shaft magnet elements. By using only one bearing, a play or tolerance of a measurement arm bearing can be undesirably increased with time owing to the friction and forces that occur. In particular, with bearings made of plastic an increase of the bearing area can result in displacement limitations and frictional forces between the bearing and the measurement arm. Furthermore, leverage forces can occur owing to the comparatively small supporting surfaces on the housing, and said leverage forces can result in expansion of the bearing and resulting additional room to move for the measurement arm and hence measurement inaccuracies.

Using the present invention, among other things higher accuracy of a filling level measurement in a container should be achieved.

Therefore, a measuring apparatus for the measurement of a filling level of a container is proposed that comprises a measurement arm that is designed to change its angular position about a rotation axis depending on the filling level. The measurement arm comprises a float element on its first end and a magnet element on a second end, wherein the magnet element is rotationally fixedly joined to the measurement arm. Further, a magnetically sensitive element is provided, which is implemented to output a measurement signal depending on the angular position of the magnet element. Furthermore, the measuring apparatus comprises a first bearing, in which the measurement arm is rotatably supported. The measuring apparatus is characterized in that a second bearing is provided, in which the measurement arm is rotatably supported, wherein the magnet element of the measurement arm is disposed in an intermediate space between the first bearing and the second bearing.

One advantage can be seen in that an end of shaft arrangement of the magnet element can be achieved with improved stability owing to less play in the bearings as well as improved accuracy. Owing to the mutually separate bearing points, a more favorable measurement arm force distribution can be achieved. As a result, for example leverage forces transverse to the rotation axis of the measurement arm can be reduced, which can result in a reduction of friction and wear and hence more accurate measurement results.

A measurement arm for this can be a rigid shaft or a rigid wire for example. The measurement arm can comprise a plurality of subregions that are in an angled arrangement relative to each other. For example, the part of the measurement arm that extends from the surface of the liquid to the housing can be disposed at an angle relative to a subregion of the measurement arm that protrudes into the housing. In one example, the measurement arm is made of a preferably rigid metal wire.

In one embodiment of the invention, the first bearing and the second bearing are provided on a housing.

A housing can mean for example a supporting body consisting of plastic. For example, in this case the housing can be made rigid in order to achieve mechanical stability against ambient influences and mechanical loads.

The bearing that is provided in a side of the housing for example can be a bore with a cross-section approximately equal to or slightly larger than a cross-section of the measurement arm in one example. In a further example, the bearing can also comprise a bearing sleeve or other suitable additional guide elements. Said additional elements as well as the bearing itself can comprise different materials and as a result different properties. The first end of the measurement arm can be located at the height of a liquid level of the container for example. For example, a float element that is made of plastic and filled with air can be mounted there, enabling the necessary buoyancy and hence the necessary coupling between the filling level and the corresponding angular position of the magnet element.

A rotationally fixed connection of the magnet element to the measurement arm can be implemented in a different way. For example, the magnet element can be attached at the level of its central axis directly and rotationally fixedly to the end of the measurement arm opposite from the float element. In one example, the magnet element is connected to the measurement arm by means of a third material, in order for example to minimize unwanted magnetic effects that could arise from the magnetic properties of the magnet element in combination with the magnetic properties of a measurement arm, for example a metallic measurement arm.

A magnetically sensitive element can mean a sensor that is implemented to detect changes of a magnetic field and to convert the same into corresponding electrical signals. The electrical signals that are produced can then be further processed by an analysis unit for example. The connection of the magnetically sensitive element to the housing can be used to provide a positionally fixed reference position relative to the rotatably supported magnet element in order thereby to effectively detect position changes of the magnet element.

In this case a measurement signal can mean for example an electrical voltage and/or an electrical current that is dependent on the angular position of the magnet element. Signals that signal the magnitude of the change are also possible.

For example, the measurement arm can be indirectly rotatably supported in the second bearing, for example by means of a connecting piece. In other words, the geometry of the measuring apparatus can comprise a spatial interruption of the measurement arm at the level of the rotation axis. This enables the support of the measurement arm on the second bearing by means of a mechanical/static local circumvention of the intermediate space. This means that a coupling or connection of the first bearing to the second bearing is made away from the rotation axis. As a result, the intermediate space is provided at the level of the rotation axis, enabling an end of shaft arrangement of the magnet element without a linearly continuous measurement arm. In this way, the magnetically sensitive element can for example be directly disposed at the level of the rotation axis of the magnet element, in order thereby to achieve high accuracy of the measurement arrangement. The rotation axes of the first bearing and of the second bearing are identical in this case. In other words, the measuring apparatus comprises a local circumvention of the region that is formed by the magnet element and the magnetically sensitive element.

According to one embodiment of the invention, the magnetically sensitive element is provided on the second bearing.

According to one embodiment of the invention, a connecting piece is provided on the measurement arm that protrudes into the intermediate space with a first segment and that is supported on the second bearing with a second segment.

A direct connection to the measurement arm can enable an advantageous transmission of force from the measurement arm to the connecting piece. In one example, the measurement arm is rotationally fixedly connected to the connecting piece. In this case a rotationally fixed connection describes a direct mechanical coupling between the connecting piece and the measurement arm during rotation of the measurement arm.

In one example, the connecting piece is mounted at the level of the rotation axis of the measurement arm. In a further example, the connecting piece is implemented in a curved form. A second end of the connecting piece can for example be supported on the second bearing so as to be rotatable about the rotation axis, so that the measurement arm together with the connecting piece is supported in the first bearing and in the second bearing.

In one example, the connecting piece is implemented in a curved form. One advantage can be seen to be that, owing to a curvature of the connecting piece, spatial circumvention of the intermediate space can be achieved instead of a direct connection. In this case the connecting piece can adopt different geometric shapes.

In this case the connecting piece can provide the intermediate space in the region of the rotation axis that can accommodate the magnet element and the magnetically sensitive element, and in doing so can at the same time enable strong support of the measurement arm again at the level of the rotation axis. In other words, the connecting piece bridges a distance between the magnet element and the magnetically sensitive element in order to use a bearing that is disposed in said region for additional support of the measurement arm. In one example, the connecting piece comprises U-shaped form in a cross-section parallel to the rotation axis. The U-shaped design of the connecting piece can be considered to be a special embodiment of the curved form of the connecting piece. For example, the connecting piece can be made symmetrically U-shaped.

In one embodiment of the invention, the connecting piece comprises a recess into which the first bearing extends for supporting the measurement arm. In a further embodiment of the invention, the measurement arm extends through the recess of the connecting piece in the first segment.

In one example, the measurement arm comprises a first region and a second region, wherein the first region encloses an angle with the second region. A stabilizing element is connected at one end to the connecting piece and/or to the first region of the measurement arm, and at the other end to the second region of the measurement arm, such that torsion and/or bending of the shaft during a change in the angular position of the measurement arm is reduced. An advantage can be seen in that a filling level-related change of angle in the form of a mainly vertical displacement, for example of the float element, can be converted into a horizontal rotary movement of the measurement arm.

Torsions and bending effects can sometimes occur here caused by the torques and bending forces that occur, which can possibly cause errors in the measurement results. The stabilizing element has a supporting function here, which can minimize such mechanical effects. For example, leverage forces, which could possibly cause torsion of the first region of the measurement arm, can be supportively absorbed by the stabilizing element. According to one example, the stabilizing element can be implemented as part of the connecting piece or can be implemented in one piece or integrally with the connecting piece. According to one embodiment of the invention, the housing comprises a plastic. One advantage of the use of plastics for housing can be seen in reduced weight with advantageous stability of the housing. Furthermore, plastics can be used advantageously in some cases in or on containers in which other container materials cannot be considered owing to chemical reactions with the container contents.

In one example, the measurement arm comprises metal or a metal alloy. One advantage can be seen, among other things, in increased stability and durability at comparatively low weight of the measurement arm. For example, the measurement arm can consist of a steel wire or a steel profile. In particular, a round cross-sectional shape of the measurement arm in the region of the bearing can be advantageous.

According to one embodiment of the invention, the bearing surface of the first and/or second bearing comprises a metal. One advantage thereof can be seen in that a metallic surface in the region of the bearing can reduce frictional forces and hence frictional losses and wear. As a result, owing to more advantageous properties of metals, tolerances or play between the bearing and the measurement arm can be kept low. This can enable increased accuracy of the measurement arrangement. For example, steel, copper or similar metals or metal alloys can be used.

In one example, the measurement arm is made of a metallic material and the first and second bearings comprise metallic bearing surfaces. In one example, the materials of the first bearing and of the second bearing can be implemented differently. For example, the first bearing is made of a plastic, wherein the second bearing is made of a metal.

According to one embodiment of the invention, the connecting piece comprises a plastic. One advantage can be seen in that owing to malleability during the manufacture of such a connecting piece, an advantageous adaptation of the structures of the connecting piece to the measurement arm and/or the magnet element is possible. Furthermore, diverse forms of the connecting piece can be implemented in a comparatively simple way depending on the circumstances of the housing, of the magnet element and of the magnetically sensitive element.

In one example, the magnetically sensitive element is a Hall effect sensor. With such a sensor, the so-called Hall effect is used for the measurement of magnetic fields. According to this principle, an output voltage is produced by the sensor that is for example proportional to the product of the magnetic field strength of the magnet element and a current through the sensor.

In one embodiment of the invention, the first segment of the connecting piece comprises the magnet element. In one example, the magnet element is disposed in or on the connecting piece. In other words, the measurement arm or the end of the measurement arm can be spatially separate from the magnet element.

For example, the magnet element can be enclosed by the connecting piece so that a magnetic interaction between the measurement arm and the magnet element is minimized. This can have the advantage that unwanted magnetic effects, which are caused for example by metallic properties of the measurement arm, can be minimized or reduced. For example, the magnet element can be encased in a connecting piece consisting of plastic, and the connecting piece is for its part connected to the measurement arm across a spatial separation. As a result, the measurement arm can be rotationally fixedly connected to the magnet element without direct mechanical contact between the measurement arm and the magnet element.

Furthermore, according to one aspect of the invention a motor vehicle is proposed that comprises a measuring apparatus as described above.

BRIEF DESCRIPTION OF THE DRAWINGS

Exemplary embodiments of the invention are described in detail below with reference to the present figures. Neither the description nor the figures should be construed as limiting the invention.

The figures are only schematic and are not to scale. In principle, identical or similar parts are provided with the same reference characters.

DETAILED DESCRIPTION

Figure 1A:
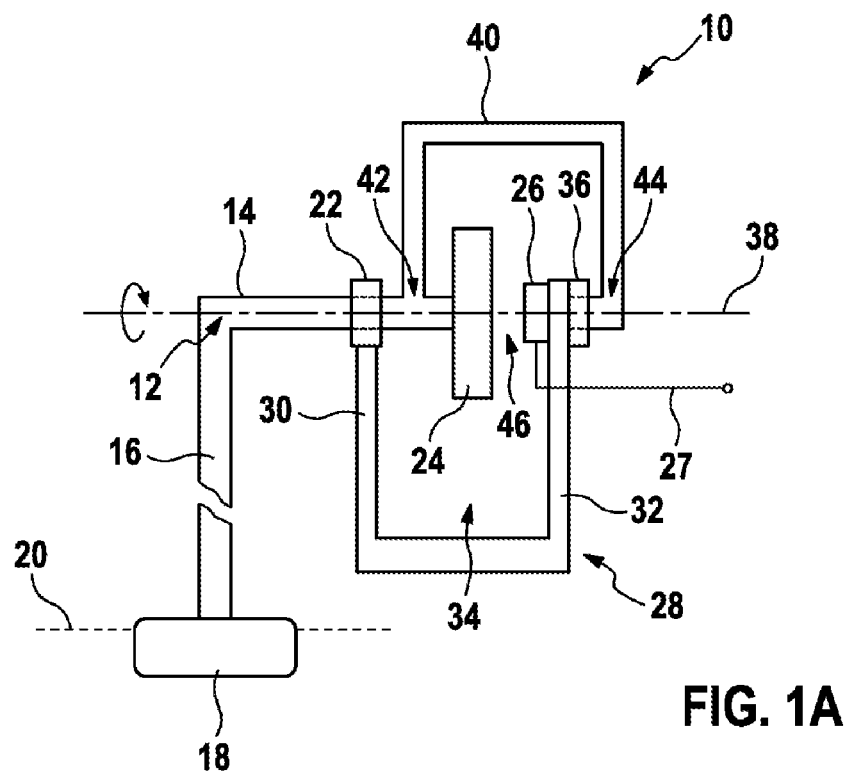
FIG. 1A shows a schematic design of a measuring apparatus according to the invention.

FIG. 1A shows a measuring apparatus 10 for measurement of a filling level of a liquid surface 20, for example in a container, in a simplified way. The measuring apparatus 10 comprises a measurement arm 12 with a first region 14 and a second region 16. The second region 16 of the measurement arm 12 protrudes towards the liquid surface 20 in this case. For this purpose, for example a float element 18 can be mounted on the remote end of the second region 16 of the measurement arm 12, which produces a coupling between the level of the liquid surface 20 and a deflection movement of the second region 16 of the measurement arm 12. In the event of a change of the liquid surface 20, a displacement of the float element 18 is produced that triggers an angular displacement of the second region 16 of the measurement arm 12. The first region 14 of the measurement arm encloses an angle, for example of 90°, with the second region 16 of the measurement arm 12 in this case. In this way, a rotary movement of the first region 14 of the measurement arm 12 occurs in the event of an angular displacement of the second region 16 of the measurement arm 12.

The first region 14 of the measurement arm 12 is rotatably supported in a first bearing 22. The measurement arm 12 comprises a magnet element 24 on its end in its first region 14. The magnet element 24 is rotationally fixedly connected to the end of the first region 14 of the measurement arm 12, so that a rotary movement of the magnet element 24 occurs during a rotational displacement of the measurement arm 12. Said rotation of the magnet element 24 is detected by a magnetically sensitive element 26 from change of the magnetic field in the surroundings of the magnet element 24 caused hereby. The magnetically sensitive element 26 produces electrical signals 27 during this, which can be processed by a connected analysis unit (not shown) for example. The magnetically sensitive sensor 26 is fixedly connected to a housing 28 in this case.

In the example shown here, the housing 28 comprises a first side 30 of the housing 28, which is opposite a second side 32 of the housing 28. The housing 28 forms an intermediate space 34 or a chamber with its first side 30 and its second side 32. The magnet element 24 as well as the magnetically sensitive element 26 are disposed in the intermediate space 34. The housing 28 comprises a stable, rigid shape in its design and owing to its material. This is used for a supporting function or a holding function, in order to enable a defined spatial arrangement of the significant components of the measuring apparatus 10.

The first bearing 22 is disposed on the first side 30 of the housing 28, so that the first region 14 of the measurement arm 12 is rotatably supported. In this way the end of the first region 14 of the measurement arm 12, on which the magnet element 24 is mounted, is disposed in the intermediate space 34. A second end of the first region 14 of the measurement arm 12, which is connected to the second region 16 of the measurement arm 12, is located outside of the intermediate space 34.

With this design, without the further elements mentioned below the supporting forces that occur would only be absorbed by the first bearing 22. This would possibly result in disadvantageous friction or wear events in the first bearing 22. Therefore, a second bearing 36 that is spatially separate from the first bearing 22 is disposed on the second side 32 of the housing 28. Said second bearing 36 forms a common rotation axis 38 with the first bearing 22. In order to enable a so-called end of shaft arrangement of the magnet element 24 on the measurement arm 12, a connecting piece 40 is provided to take up the supporting forces, being rotationally fixedly connected to the first region 14 of the measurement arm 12 at a first end 42 of the connecting piece 40. The connecting piece 40 is supported at a second end 44 in the second bearing 36.

In the example represented here, the connecting piece 40 is designed to be curved or U-shaped in order to spatially circumvent the region of the magnet element 24 and of the magnetically sensitive element 26 and to enable a second bearing point that is spatially separate from the first bearing 22 by means of supporting the second end 44 of the connecting piece 40 in the second bearing 36. The advantageous force distribution of the supporting forces of the measurement arm 12 on the housing 28 can be enabled hereby. Smaller leverage forces act transversely to the rotation axis 38 owing to the spatial separation of the two bearings 22, 36. This can improve the operating life as well as the play or tolerances of the bearings 22, 36. In the example shown here, the second end 44 of the connecting piece 40 comprises an end region that extends along the rotation axis 38 and is supported in the bearing 36.

Owing to said design, a gap 46 between the magnet element 24 and the magnetically sensitive element 26 that is advantageous for accurate measurement can be enabled. This can increase the accuracy of the measurement results.

Figure 1B:
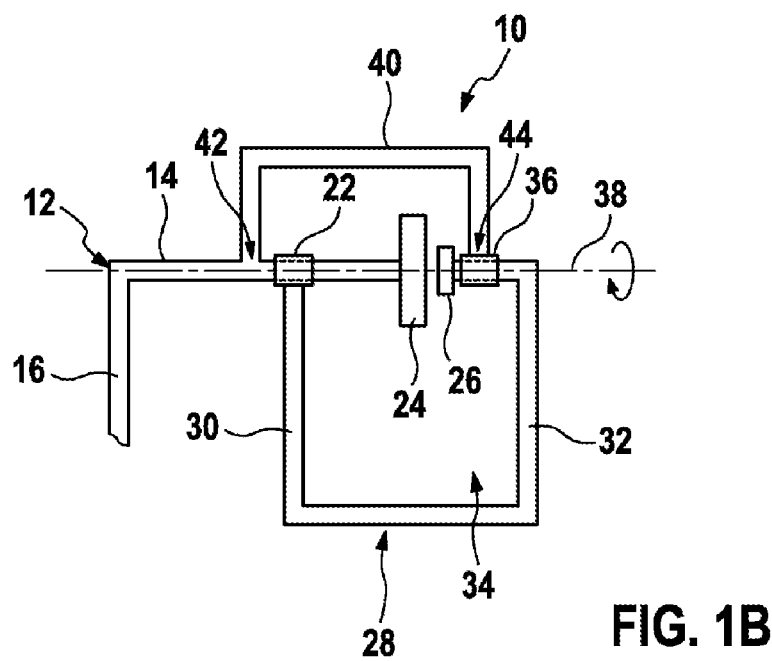
FIG. 1B shows schematically an alternative design of a measuring apparatus according to the invention.

An example of a measuring apparatus 10 is shown in FIG. 1B, which shows an alternative design variant of the measuring apparatus 10 according to the invention. The measuring apparatus 10 represented in said example is similar in its implementation to the example represented in FIG. 1A. In contrast to the exemplary embodiment that is shown in FIG. 1A, the connecting piece 40 is supported on a casing surface in the bearing 36. Furthermore, in the example that is shown in FIG. 1B, the connecting piece 40 is connected at its first end 42 to the first region 14 of the measurement arm 12 outside of the housing 28 and outside of the intermediate space 34. The axes of the first bearing 22 and of the second bearing 36 lie on the common rotation axis 38 in this case.

Figure 2:
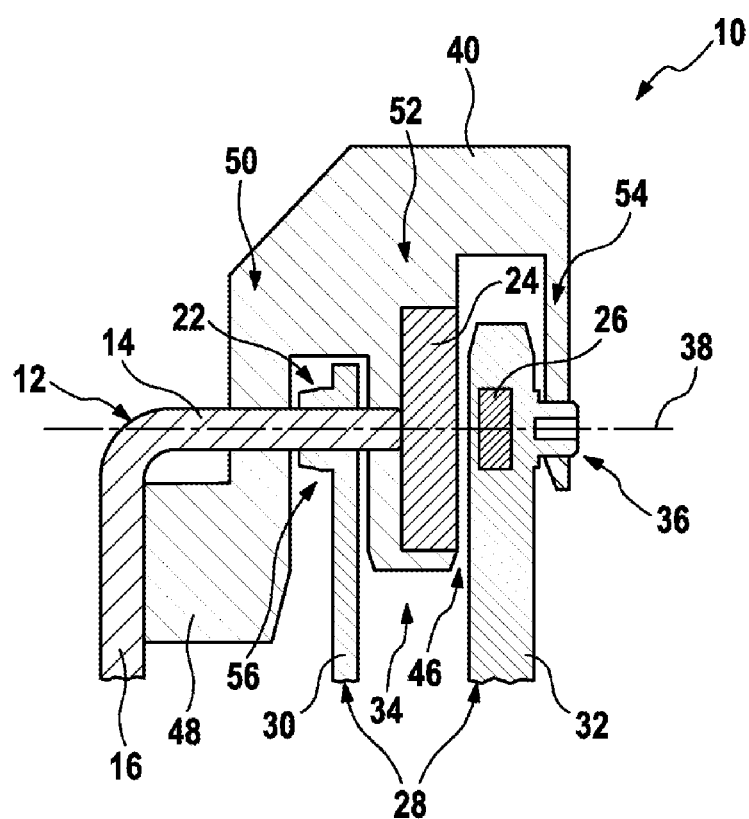
FIG. 2 shows a simplified sectional representation of a measuring apparatus according to the invention for measurement of a filling level of a container.

FIG. 2 shows a further exemplary embodiment of a measuring apparatus for the measurement of a filling level of a container. A measurement arm 12 has a shape that is angled by 90° and is disposed in a first bearing 22 on a first side 30 of a housing 28. A magnet element 24 is enclosed by a connecting piece 40 and is supported thereby. This can be achieved by casting or gluing the magnet element 24 in the connecting piece 40 for example. One end of the first region 14 of the measurement arm 12 is rotationally fixedly connected to the connecting piece 40 in the region of the intermediate space 34 between the first side 30 of the housing and the second side 32 of the housing. Owing to the respective rotationally fixed connection of the measurement arm 12 to the connecting piece 40 as well as the likewise rotationally fixed connection of the connecting piece 40 to the magnet element 24, an intermediate space is enabled between the end of the first region 14 of the measurement arm 12 and the magnet element 24. This can have advantageous effects owing to the resulting reduced magnetic interactions between the mainly metallic measurement arm 12 and the magnet element 24.

The connecting piece 40 comprises an approximately U-shaped form and is supported at its second end 44 in a second bearing 36 on the outside of the second side 32 of the housing 28. In this way, a gap 46 is produced between the magnet element 24 and the second side 32 of the housing. A magnetically sensitive element 26 is disposed on or in the second side 32 of the housing 28 in the vicinity of and at the level of the rotation axis 38. The magnetically sensitive element 26 can be a sensor based on the Hall effect here for example. For example, a centre point of the magnetically sensitive element 26 lies opposite a magnetic centre point of the magnet element 24 on the rotation axis 38.

The connecting piece 40 comprises a third segment 50 that is connected to the measurement arm 12 in the example shown here and can for example comprise the stabilizing element 48. A second segment 54 is used to support the connecting piece 40 on the second bearing 36. A first segment 52 of the connecting piece 40 protrudes into the intermediate space 34. The connecting piece 40 comprises a recess 56 in the region of the first bearing 22. In this case the recess 56 is dimensioned so that it encloses the bearing 22 at a distance.

In addition, in the example shown here a stabilizing element 48 is provided that rotationally fixedly connects the connecting piece 40 to the first region 14 of the measurement arm 12 and in its further extent additionally connects the first region 14 of the measurement arm 12 to the second region 16 of the measurement arm by means of a separate spatial connection. In this way, bending and/or torsion of the measurement arm 12 caused by the displacement of the measurement arm 12 can be reduced, in particular in the vicinity of the first region 14 of the measurement arm 12.

In one example, the housing 28 consists of a plastic. In a further example, the bearing surface of the first bearing 22 and/or of the second bearing 36 comprises a metal. For example, for this purpose metal casings can be mounted in the interior of the bearing in order for example to be able to use different materials for the bearing surfaces and the housing 28. In one example, the second bearing 36 comprises a metal on its bearing surfaces on the housing side and the connecting piece 40 is made of a plastic, for example in the region of the bearing. In a further example, the connecting piece 40 comprises a different material in the region of the first bearing 22 and/or in the region of the second bearing 36 from the material in the remaining region of the connecting piece 40. This can be advantageous in order to achieve smaller tolerances and greater durability in the region of the bearing owing to harder materials for example.

In addition, it is to be noted that "comprising" does not exclude other elements or steps and "a" or "one" does not exclude any number. Further, it is to be noted that features or steps that are described with reference to one of the above exemplary embodiments can also be used in combination with other features or steps of other exemplary embodiments described above. Reference characters in the claims are not to be considered as limiting.

What is claimed is:

1. A measuring apparatus (10) for the measurement of a filling level of a container, the measuring apparatus comprising
    a measurement arm (12) having an angular position that changes about a rotation axis (38) depending on the filling level, wherein the measurement arm (12) comprises a float element (18) on a first end and a magnet element (24) on a second end, and wherein the magnet element (24) is rotationally fixedly connected to the measurement arm (12) and has an angular position;
    a first bearing (22), in which the measurement arm (12) is rotatably supported;
    a second bearing (36) in which the measurement arm (12) is rotatably supported; and
    a magnetically sensitive element (26) configured to output a measurement signal (27) depending on the angular position of the magnet element (24), wherein the magnetically sensitive element (26) is provided on the second bearing (36),
    wherein the first bearing (22) and the second bearing (36) are provided on a housing (28),
    wherein the magnet element (24) of the measurement arm (12) is disposed in an intermediate space (34) between the first bearing (22) and the second bearing (36)
    wherein the measurement arm (12) has thereon a connecting piece (40) that is rotationally fixedly connected to the measurement arm (12),
    wherein the measurement arm (12) is rotatably supported in the second bearing (36) via the connecting piece (40),
    wherein the connecting piece (40) protrudes with a first segment (52) into the intermediate space (34),
    wherein the first segment (52) of the connecting piece (40) comprises the magnet element (24), and
    wherein the connecting piece (40) is mounted in the second bearing (36) with a second segment (54).

2. The measuring apparatus as claimed in claim 1, wherein the connecting piece (40) comprises a recess (56), into which the first bearing (22) protrudes to support the measurement arm (12).

3. The measuring apparatus as claimed in claim 1, wherein the measurement arm (12) extends through the recess (56) of the connecting piece (40) into the first segment (52) of the connecting piece (40).

4. The measuring apparatus as claimed in claim 1, wherein a bearing surface of the first (22) bearing comprises a metal.

5. The measuring apparatus as claimed in claim 4, wherein a bearing surface of the second (36) bearing comprises a metal.

6. A motor vehicle, comprising a measuring apparatus (10) as claimed in claim 1.

7. The measuring apparatus as claimed in claim 1, wherein a bearing surface of the second (36) bearing comprises a metal.

* * * * *